Patented Nov. 24, 1925.

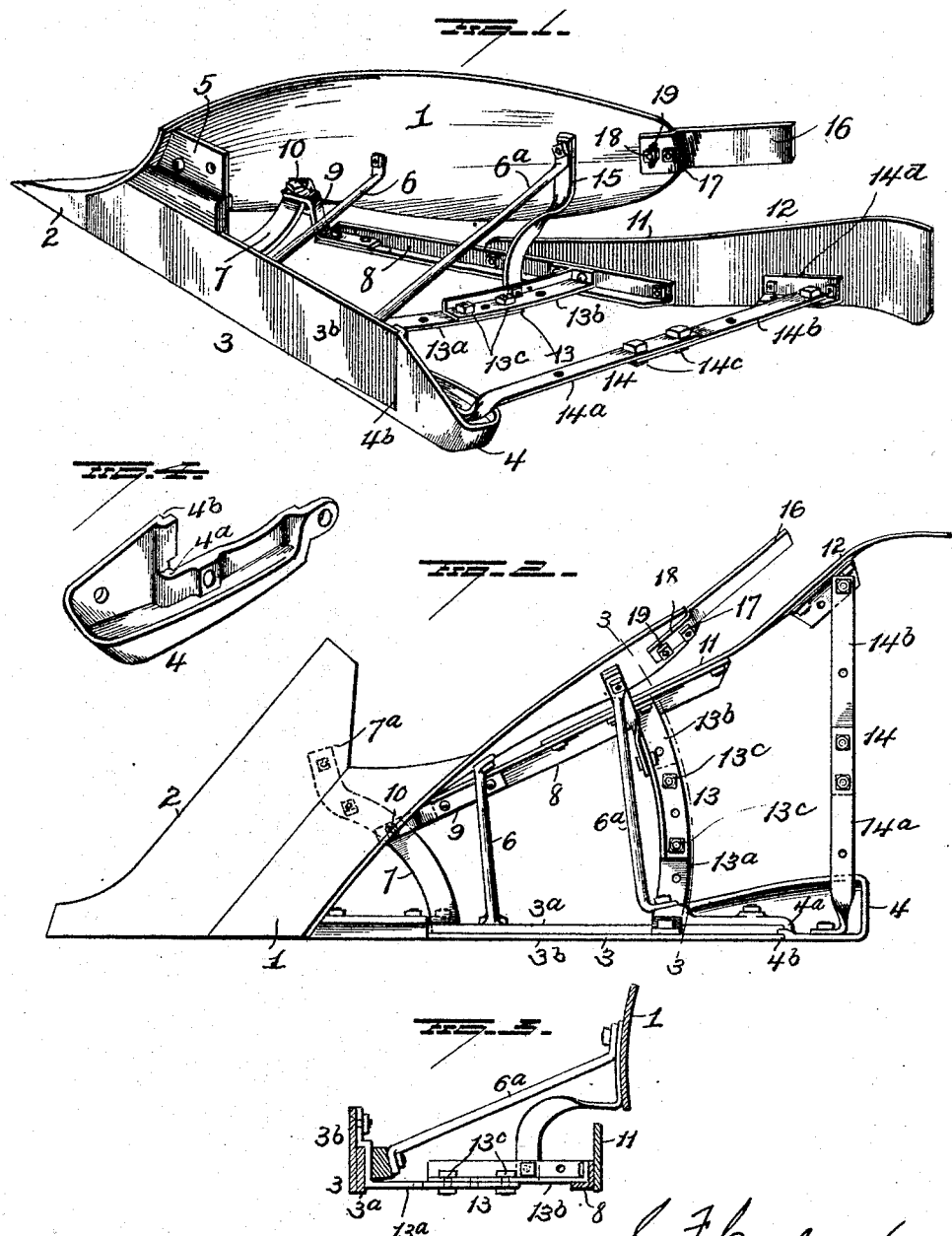

1,563,252

UNITED STATES PATENT OFFICE.

CHARLES F. CARLSON, OF SOUTH BEND, INDIANA, ASSIGNOR TO OLIVER CHILLED PLOW WORKS, OF SOUTH BEND, INDIANA.

PLOW.

Application filed November 23, 1920. Serial No. 426,041.

*To all whom it may concern:*

Be it known that I, CHARLES F. CARLSON, a citizen of the United States, and a resident of South Bend, in the county of Saint Joseph and State of Indiana, have invented certain new and useful Improvements in Plows; and I do hereby declare the following to be a full, clear, and exact description of the invention, such as will enable others skilled in the art to which it appertains to make and use the same.

This invention relates to improvements in plows and more particularly to attachments therefor.

A very common difficulty in the plowing of some characters of soil,—particularly marsh land,—is that the furrow slices fail to come in close contact with each other and thus permits the formation of crevices from which vegetation may protrude and in which undesired vegetation may grow, and leaving the plowed ground in a rough and uneven condition.

One object of my invention is to provide means to overcome the objections above mentioned and, to this end, to provide means whereby the furrow slices may be caused to lie comparatively flat against each other and closely together thus causing the plowed ground to present a comparatively level surface, eliminating the valleys or crevices so common in plowed ground where the furrow slices lean against each other.

A further object is to provide a plow structure which will operate, not only to cause vegetation to be buried under the furrow slices but also to close the crevices or valleys such as heretofore found in plowed ground and thus preclude the growth of undesired vegetation between the furrow slices.

A further object is to provide a plow with means which, in addition to effecting the results above explained, will operate to so widen the furrow that the wide wheels of a tractor or wheels with extension rims connected with the plow, will be permitted to run on the bottom of the furrow.

With these and other objects in view, the invention consists in certain novel features of construction and combinations of parts as hereinafter set forth and pointed out in the claims.

In the accompanying drawings; Figure 1 is a perspective view of a plow structure showing an embodiment of my invention; Figure 2 is a plan view; Figure 3 is a sectional view on the line 3—3 of Figure 2, and Figure 4 is a separate perspective view of the share at the rear end of the landside.

The plow base shown in the drawing comprises a moldboard 1, a share 2 and a landside 3, to the rear end of which latter, a shoe 4 is secured and forms, in effect, an extension of the landside. The landside may comprise a bar $3^a$ projecting rearwardly from the share, and a landside wear plate $3^b$ secured to said bar. The shoe 4 may be made hollow and bolted to the landside bar $3^a$,—said shoe being shouldered at $4^a$ to overlie the rear end of the landside bar so that the outer face may align with the outer face of the landside wear plate and the upright wall of the shoe is shouldered at $4^b$ to receive the rear end of said wear plate. A frog or bracket may be provided at 5 to be secured to a plow standard. The share and moldboard are suitably secured together and the landside bar and moldboard may be braced by means of suitable rods or bars 6, $6^a$.

A curved brace 7 is secured to the landside bar $3^a$ and to the moldboard and is bolted to both, and one end portion $7^a$ of this brace may constitute a portion of the means for securing the share to the moldboard.

A bar 8, preferably angular in cross-section, is pivotally connected to the brace 7 through the medium of an arm 9 rigidly secured to the forward portion of said bar and provided with an angular portion pivoted to said brace at 10. To one side of the bar 8, a wing or blade 11 is rigidly secured, and has a general tapering shape with one edge in alignment with the outer face of said bar. The wing or blade is so bent that the portion thereof which extends rearwardly beyond the bar 8 marks a compound curve, as indicated at 12,—said wing or blade occupying a position somewhat inwardly removed from the back of the moldboard as indicated in Figure 2 of the drawing. It will be observed that the major portion of the lower edge of the wing or blade is in substantially the same horizontal plane as that of the lower edge of the landside (see Fig. 3) and will therefore occupy a position in the bottom of the furrow made by the plow, and said wing or blade is of such length and is so disposed that it will project rearwardly beyond the moldboard and its rear portion caused to project several inches laterally beyond the plane of the rear extremity of the share, as will be evidenced by reference to Figure 2 of the drawing, and it will therefore operate to push the furrow slice laterally after it shall have been turned by the mold board.

The bar 8 of the wing or furrow slice crowding member 11 being pivotally connected at its forward end to a part rigid with the plow structure (the forward brace 7), said wing or pusher is capable of lateral adjustment relatively to the moldboard, and it is held rigidly in the position to which it may be adjusted by means of adjustable cross braces 13, 14. The cross brace 13 may be curved and comprise two members 13$^a$ and 13$^b$,—the former being secured to the landside and the latter to the bar 8 of the wing or crowding member 11, and each of said members may be provided with a plurality of perforations to receive bolts 13$^c$ by means of which said members may be secured together at the desired adjustment. The cross brace 14 comprises two perforated members 14$^a$, 14$^b$ secured together at the desired adjustment by bolts 14$^c$,—one end of the brace member 14$^a$ being attached to the rear portion of the shoe 4 and the other brace member 14$^b$ being adjustably attached to an angle piece 14$^d$ secured to the wing or crowding member 11. In order to insure the rigidity of the wing or pusher 11 and to guard against possibility of vertical displacement thereof when in use, a twisted brace 15 is secured at one end to the rear portion of the moldboard and at its lower end, said brace is adjustably connected with a flange on the member 13$^b$ of the intermediate cross brace 13.

A supplemental wing 16 may be provided at the rear end of the mold board to assist in forcing over the top portion of the furrow slice and leveling the same. This supplemental wing is connected with the moldboard by bolts 17 and 18, the former passing through a hole in the forward portion of said wing and through the moldboard, and the other bolt 18 passing through a slot 19 in the wing 16 and through the mold board, so that the angularity of said wing may be adjusted.

The operation of the plow provided with my improvements is as follows:—

Let it be assumed that the plow is such as will cut a twenty-inch furrow. The wing or furrow slice crowding member will be so adjusted that its rear portion will project laterally approximately four inches farther than lateral extremity of the rear end of the share. The wing will then operate to crowd the furrow slice laterally an additional four inches, thereby leaving a twenty-four inch furrow. After the first furrow shall have been made, the twenty-inch slice cut by the plow will be deposited in a twenty-four inch furrow and will lie comparatively flat instead of leaning against the previously cut furrow slice as it would do if the furrow had not been widened by the operation of the crowding member. The furrow slice having been deposited flatly into the furrow, the crowding member will now operate to push the furrow slice laterally, crowding it closely to the previous furrow slice, closing the valley or crevice between said furrow slices, leaving the surface of the plowed ground comparatively level and establishing a twenty-four inch furrow to receive the next furrow slice. Vegetataion will be dragged under when the twenty-inch furrow slice is deposited in the twenty-four inch furrow and as the valleys or crevices are closed when one furrow-slice is crowded over to the previous furrow slice, the growing of rank or undesirable vegetation between the furrow slices will be precluded. Furthermore, my improvements insure a furrow of sufficient width to permit the extension rim of a tractor wheel or a wide tractor wheel to run on the bottom of the furrow.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. An attachment for a plow base of the landside and mold board type, comprising a furrow crowding member adapted to run in the bottom of a furrow, and securing means for connecting said member with a plow base so that it will extend rearwardly of the mold board and laterally of the path of travel of the plow base, said member having a rear lateral curvature.

2. An attachment for a plow base of the landside and moldboard type, comprising a furrow crowding member adapted to run in the bottom of a furrow, and securing means for connecting said member with a plow base so that it will extend rearwardly of the mold board and laterally of the path of travel of the plow base, said member having a laterally curved portion terminating in the portion disposed laterally of the path of travel of the plow base.

3. An attachment for a plow base having a mold board and landside, comprising a furrow-slice crowding member, and means for securing said crowding member to a plow base between the land side and mold-board and in proximity to the latter, said crowding member having a rear laterally extending portion to project rearwardly beyond the mold board of the plow base and laterally beyond the path of the plow base, said member having a laterally curved portion terminating in the portion disposed laterally of the path of travel of the plow base.

4. An attachment for a plow base of the landside and mold board type, comprising a furrow crowding member adapted to run in the bottom of a furrow, and securing means for connecting said member with a plow base so that it will extend rearwardly of the mold board and laterally of the path of travel of the plow base, said member having a laterally curved portion terminating in the portion disposed laterally of the path of travel of the plow base, said securing means including adjustable members to be disposed between said crowding member and the landside side of the plow base, and means for pivotally connecting the forward end of said crowding member with the forward portion of the plow base.

5. The combination with a plow base, of a furrow slice crowding member attached to said base independently of the mold board thereof and adapted to run in the furrow, said member extending rearwardly of the mold board and having a rear portion disposed laterally from the path of travel of the plow base, said member having a laterally curved portion terminating in the portion disposed laterally of the path of travel of the plow base.

6. The combination with a plow base, of a furrow slice crowding member attached to said base independently of the mold board thereof and adapted to run in the furrow, said member having a curved portion extending rearwardly of the mold board and terminating in a portion disposed laterally of the path of travel of the mold board.

7. The combination with a plow base including a land-side and a mold-board, of a member attached to said base between the land-side and mold-board and extending rearwardly beyond the mold-board and having its rear portion disposed laterally from the path of travel of the plow base and operable to crowd a furrow slice laterally over a previously turned furrow slice, said member having a laterally curved portion terminating in the portion disposed laterally of the path of travel of the plow base.

8. The combination with a plow base including a land-side and a mold-board, of a member attached to said base between the land-side and mold-board and extending rearwardly beyond the mold-board and having its rear portion disposed laterally from the path of travel of the plow base, said member having a laterally curved portion terminating in the portion disposed laterally of the path of travel of the plow base and operable to crowd a furrow slice laterally over a previously turned furrow slice, said member having its lower edge disposed approximately in the horizontal plane of the bottom of the plow base.

9. The combination with a plow base including a land-side and a mold board, of a member attached to said base between the land-side and mold-board and extending rearwardly beyond the mold-board and having its rear portion disposed laterally from the path of travel of the plow base, said member having a laterally curved portion terminating in the portion disposed laterally of the path of travel of the plow base and operable to crowd a furrow slice laterally over a previously turned furrow slice, the forward end portion of said member having pivotal connection with the forward portion of the plow base, and adjustable braces between said member and the landside side of the plow base.

10. The combination with a plow base, of a furrow slice crowding member pivotally connected therewith and projecting rearwardly beyond the moldboard of said base and laterally beyond the plane of the rear end of the share thereof, a two part adjustable brace between said furrow slice crowding member and the landside portion of the base, and a brace connected to one of the parts of said first-mentioned brace and with the mold board.

11. The combination with a plow base and a brace between the landside and moldboard thereof, and a shoe secured to the rear end of the landside of said base, of a bar pivotally connected with said brace and projecting rearwardly therefrom, a wing secured to said bar and constituting a furrow slice crowding member projecting rearwardly beyond the moldboard and laterally beyond the plane of the rear end of the share of said base, an adjustable brace between said bar and the landside, and an adjustable brace between the furrow slice crowding member and the landside shoe.

In testimony whereof, I have signed this specification.

CHARLES F. CARLSON.